United States Patent
Bellows et al.

(10) Patent No.: US 12,547,451 B2
(45) Date of Patent: Feb. 10, 2026

(54) RULES-BASED TASK ALLOCATION FOR EDGE NETWORKS

(71) Applicant: Rockwell Collins, Inc., Cedar Rapids, IA (US)

(72) Inventors: Peter R. Bellows, Marion, IA (US); Alexei Tchernoraenko, Iowa City, IA (US); Brian R Wolford, Cedar Rapids, IA (US); Joshua A. Slagle, Marion, IA (US); Jesse A. Lane, Mount Pleasant, SC (US)

(73) Assignee: Rock ell Collins, Inc., Cedar Rapids, IA (US)

( * ) Notice: Subject to any disclaimer, the term of this patent is extended or adjusted under 35 U.S.C. 154(b) by 448 days.

(21) Appl. No.: 18/130,746

(22) Filed: Apr. 4, 2023

(65) Prior Publication Data

US 2024/0338244 A1    Oct. 10, 2024

(51) Int. Cl.
   *G06F 9/48* (2006.01)
   *G06F 9/445* (2018.01)
   *G06F 9/54* (2006.01)

(52) U.S. Cl.
   CPC ........ *G06F 9/4881* (2013.01); *G06F 9/44526* (2013.01); *G06F 9/541* (2013.01)

(58) Field of Classification Search
   None
   See application file for complete search history.

(56) References Cited

U.S. PATENT DOCUMENTS

| | | | |
|---|---|---|---|
| 7,451,023 B2 | 11/2008 | Appleby et al. | |
| 7,454,427 B2 | 11/2008 | Jackson | |
| 7,519,569 B1 | 4/2009 | Flynn et al. | |
| 7,734,386 B2 | 6/2010 | DelNero et al. | |
| 7,823,185 B1* | 10/2010 | Seaman | H04L 63/10 709/201 |
| 8,078,319 B2 | 12/2011 | Franke et al. | |
| 8,452,475 B1 | 5/2013 | West et al. | |
| 8,914,182 B2 | 12/2014 | Casado et al. | |
| 8,977,410 B2 | 3/2015 | Wood et al. | |
| 9,466,219 B1 | 10/2016 | Stefani et al. | |
| 9,671,790 B2 | 6/2017 | Srivastava et al. | |
| 10,203,701 B2 | 2/2019 | Kurdi et al. | |
| 10,249,197 B2 | 4/2019 | Castillo-Effen et al. | |
| 10,540,898 B2 | 1/2020 | Kim et al. | |
| 10,656,643 B1 | 5/2020 | Bertram et al. | |

(Continued)

OTHER PUBLICATIONS

Yang et al.; "Cloudlet Placement and Task Allocation in Mobile Edge Computing"; Jun. 2019; IEEE Internet Of Things Journal, vol. 6, No. 3; pp. 5853-5863. (Year: 2019).*

(Continued)

*Primary Examiner* — Umut Onat
(74) *Attorney, Agent, or Firm* — Suiter Swantz IP

(57) ABSTRACT

A stack is described. The stack includes a rule engine. The rule engine is accessed via application programming interface (API) from any plug-in mission service. The rule engine includes rules and facts. The rules and facts are loaded separately from the API and from a cloudlet monitor. The rules and facts do not require source code updates to change. The stack is executable on processors of a node within a cloudlet. The cloudlet includes multiple of the nodes. The stack divides high-level tasks into low-level tasks which are individually executable by the nodes in the cloudlet.

16 Claims, 8 Drawing Sheets

(56) References Cited

U.S. PATENT DOCUMENTS

| | | |
|---|---|---|
| 11,119,485 B1 | 9/2021 | Barsamian |
| 11,132,100 B1 | 9/2021 | Patel et al. |
| 11,209,816 B2 | 12/2021 | Beth et al. |
| 11,323,886 B2 | 5/2022 | Bentley et al. |
| 11,341,859 B1 | 5/2022 | Shepherd et al. |
| 11,345,473 B1 | 5/2022 | Liberko et al. |
| 11,422,549 B2 | 8/2022 | Ridings et al. |
| 11,423,789 B2 | 8/2022 | Svatek et al. |
| 11,436,931 B1 | 9/2022 | Walker et al. |
| 11,473,913 B2 | 10/2022 | Koubaa |
| 11,483,349 B2 | 10/2022 | Baggeroer et al. |
| 2003/0226033 A1* | 12/2003 | Zinda ............ H04L 63/101 713/170 |
| 2010/0205021 A1 | 8/2010 | Jewett et al. |
| 2012/0042075 A1 | 2/2012 | Goetz et al. |
| 2014/0279808 A1 | 9/2014 | Strassner |
| 2016/0246297 A1 | 8/2016 | Song |
| 2021/0073047 A1* | 3/2021 | Bhandaru ............ G06F 9/5044 |
| 2022/0028283 A1 | 1/2022 | Liberko et al. |
| 2022/0101733 A1 | 3/2022 | Dunlay et al. |
| 2022/0189320 A1 | 6/2022 | Melodia et al. |
| 2022/0326998 A1* | 10/2022 | Durairaj ............ G06F 9/5083 |
| 2023/0350708 A1* | 11/2023 | Draznin ............ G06F 11/3006 |

OTHER PUBLICATIONS

Airbus S.A.S. Product Safety Department (GS); "Are You Properly Seated?", Safety First #25, Jan. 2018.

Salaheldin Ashraf Abdulrahiem Ahmed, "Expert System-based Autonomous Mission Control for Unmanned Aerial Vehicle,"; Master Thesis, Dept. of Computer Science, Chair of Computer Engineering, Technische Universitat Chemnitz, Jun. 12, 2017.

Tim Niemueller, et al., "Goal Reasoning in the CLIPS Executive for Integrated Planning and Execution,"; Proceedings of the Twenty-Ninth International Conference on Automated Planning and Scheduling (ICAPS 2019); Association for the Advancement of Artificial Intelligence (www.aaai.org).

European Patent Office, Extended European Search Report received in EP Application No. 24168221.0, Sep. 19, 2024, 11 pages.

Jin et al., "Distributed Rule-Enabled Interworking Architecture Based on the Transparent Rule Proxy in Heterogeneous IoT Networks," Sensors, vol. 23, No. 4, Feb. 8, 2023, 18 pages.

Jin, "Edge artificial intelligence-based affinity task offloading under resource adjustment in a 5G network," Applied Intelligence, Kluwer Academic Publishers, Dordrecht, NL, vol. 52, No. 7, Oct. 21, 2021, 22 pages.

* cited by examiner

101

500

510 Monitor Status Information of Worker Nodes

520 Maintain Status Information as Facts

FIG. 5

RULES-BASED TASK ALLOCATION FOR EDGE NETWORKS

TECHNICAL FIELD

The present invention generally relates to edge networks, and more specifically to the allocation of tasks to nodes in the edge networks.

BACKGROUND

Military edge networks have increasingly more devices of heterogenous types. Mission operations require complex coordination between the devices. The speed and scale of the mission is difficult for human operators to decide and manage the devices in a timely manner. Therefore, it would be advantageous to provide a device, system, and method that addresses the shortcomings described above.

SUMMARY

A system is described in accordance with one or more embodiments of the present disclosure. In some embodiments, the system includes a control station. In some embodiments, the system includes a cloudlet. In some embodiments, the cloudlet is communicatively coupled to the control station by a network.

The cloudlet is described in accordance with one or more embodiments of the present disclosure. In some embodiments, the cloudlet includes a plurality of worker nodes. In some embodiments, the cloudlet comprises a master node.

The master node is described in accordance with one or more embodiments of the present disclosure. In some embodiments, the master node includes a memory maintaining program instructions. In some embodiments, the master node includes one or more processors configured to execute the program instructions. In some embodiments, the program instructions may cause the one or more processors to execute a stack comprising a command processor application programming interface (CpApi), a cloudlet monitor, a rule engine, a task engine, and a plurality of plugins. In some embodiments, the CpApi is configured to receive a node mission configuration of a plurality of worker nodes, a rule engine context, and a task execution request. In some embodiments, the task execution request comprises a high-level task which is not individually executable by the master node. In some embodiments, the cloudlet monitor is configured to monitor status information of the plurality of worker nodes. In some embodiments, the rule engine is configured to receive and maintain the node mission configuration and the status information as a plurality of facts. In some embodiments, the rule engine is configured to receive the rule engine context and maintain the rule engine context as a plurality of rules. In some embodiments, the task engine receives the high-level task from the CpApi and delegates the high-level task to one plugin of the plurality of plugins. In some embodiments, the one plugin divides the high-level task into a plurality of low-level tasks. In some embodiments, the rule engine generates a list of one or more of the worker nodes for each of the plurality of low-level tasks based on the plurality of facts and the plurality of rules in the expert system. In some embodiments, the plurality of low-level tasks are individually executable by the one or more of the worker nodes. In some embodiments, the one plugin assigns the plurality of low-level tasks to worker nodes in the list of the one or more worker nodes for each of the plurality of low-level tasks.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 4-6 depict a flow diagram of a method, in accordance with one or more embodiments of the present disclosure.

DETAILED DESCRIPTION OF THE INVENTION

Figure 1A:
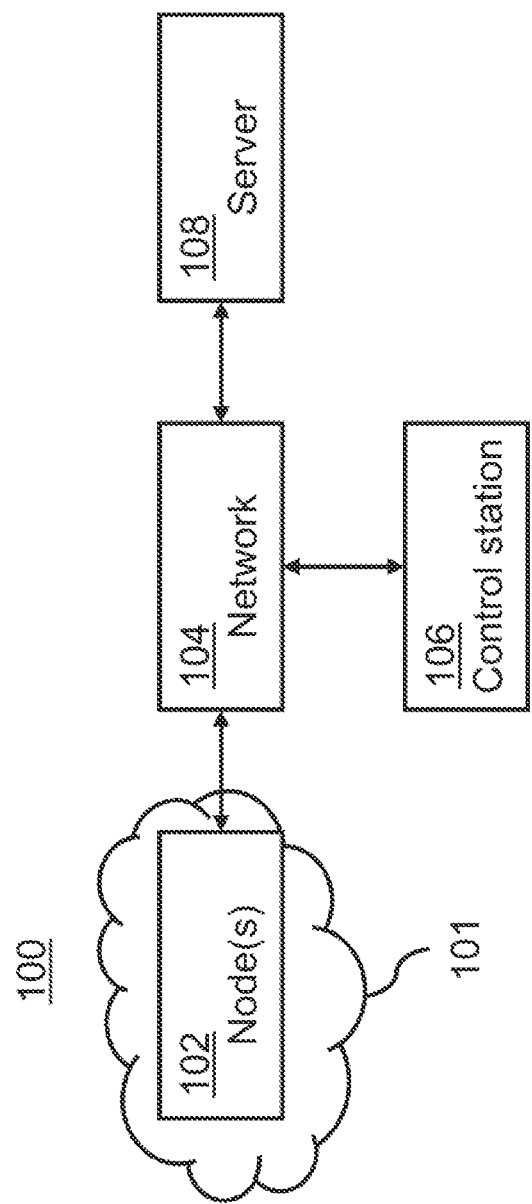
FIG. 1A depicts a simplified block diagram of a system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a"

and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring generally now to one or more embodiments of the present disclosure. Embodiments of the present disclosure are generally directed to a general-purpose rule engine. The rule engine describes the capabilities of an edge network and the requirements for mission tasks. The rule engine includes policy-based mission customization and programmatic interfaces for optimal matching of tasks to nodes. Advantageously, the rule engine takes into account platform capability and dynamic conditions when assigning tasks.

An extensible approach for programmatically assigning mission tasks to nodes is described. The extensible approach considers a fixed capability of the edge assets and dynamic conditions regarding the edge assets. The extensible approach includes a rule engine describing the capabilities of the edge assets and the requirements for mission tasks. The rule engine includes policy-based mission customization and programmatic interfaces for optimal matching of tasks to nodes. The extensible approach applies to "edge networks" that can be assigned various execution tasks in real-time, such as, but not limited to, the "Battlefield of Things." In embodiments, the extensible approach uses "Internet of Things" descriptors for platforms to advertise capability.

U.S. Pat. No. 11,345,473, titled "System and method for preventing inadvertent loss of surveillance coverage for an unmanned aerial system (UAS)", filed on Dec. 5, 2019; U.S. Pat. No. 9,466,219, titled "Unmanned vehicle mission planning, coordination and collaboration", filed on Jun. 27, 2014; are incorporated herein by reference in the entirety.

Figure 1B:
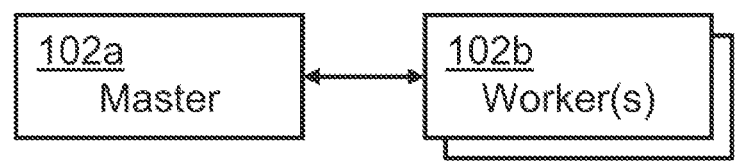
FIG. 1B depicts a simplified block diagram of cloudlet of the system of FIG. 1A, in accordance with one or more embodiments of the present disclosure.

Referring now to FIGS. 1A-1B, a system 100 is described, in accordance with one or more embodiments of the present disclosure. The system 100 may also be referred to as an edge network or an edge management system. The system 100 may include one or more nodes 102, a network 104, a control station 106, a server 108, and the like.

The nodes 102 may be any connected node. The connected nodes may include, but are not limited to, ground sensors, handheld radios, back-back computers, aerial vehicles, unmanned aerial vehicles and the like. The nodes 102 may also be embodied in a variety of applications, such as, but not limited to, aircraft domains, delivery systems, large-scale distributed computing clusters, and the like. The nodes 102 may be referred to as edge assets in an edge network. The nodes 102 may be any edge asset. For example, the nodes 102 may be aerial vehicle, a rover, a manned vehicle, and the like. The nodes 102 may generally include any computational node that can perform tasks during a mission. In embodiments, the nodes 102 are aerial vehicles. The aerial vehicles may include any type of aerial vehicle such as, but not limited to, fixed-wing aircraft, a rotorcraft, jet-propelled vehicle (e.g., rocket), balloon, airship, and the like. Fixed-wing aircraft may refer to aircraft with wings which are fixed to a bulkhead or fuselage of the aircraft. Rotorcraft may refer to aircraft with wings or rotors mounted on a spinning shaft. In embodiments, the aerial vehicles are unmanned aerial vehicles (UAVs). The UAVs may include any type of the previously described aerial vehicles. The UAVs may include any unmanned aerial vehicle including, but not limited to, civilian drones, commercial drones, military drones, transport drones, and the like. The UAVs may also be referred to as a drone, an unmanned aircraft, and the like.

The control station 106 may be positioned remotely with respect to the nodes 102. The control station 106 may be positioned within any ground control station, operation center, mobile control station, airborne control station, or the like. In embodiments, the control station 106 is an airborne early warning and control system (AWACS) aircraft. The control station 106 may provide tasks to the nodes 102. The unmanned aircraft system 100 may be referred to as a remotely piloted aircraft system (RPAS) when the nodes 102 are piloted by the control station 106.

In embodiments, the control station 106 may provide a command and control (C2) link to the nodes 102. The C2 link may generate one or more command and control (C2) signals configured to cause the nodes 102 to perform various tasks, functions, and/or prescribed flight plan maneuvers. The nodes 102 may receive the C2 signals and execute the various control commands. The control commands may cause the nodes 102 (e.g., via onboard processing) to execute one or more flight maneuvers. For example, the one or more flight maneuvers may include any flight maneuvers including, but not limited to, a change in altitude, a change in attitude (e.g., orientation with respect to one or more rotational axes), a change in heading, a change in position, follow a flight plan, a backtracking maneuver (e.g., backtracking along a flight path), a homing maneuver (e.g., returning to the control station 106), a hover-and-hold maneuver, a climb-and-hold maneuver, and the like. It is further contemplated that the control commands may be associated with non-aerial vehicles where the nodes 102 are a non-aerial vehicle node. The control commands may also include a deploy payload command. The deploy payload command may cause the nodes 102 (e.g., via onboard processing) to deploy a payload. In embodiments, the nodes 102 may execute the various control commands on one or more computing systems by applications above an operating system layer.

Although the unmanned aircraft system 100 is described as including the control station 106, this is not intended as a limitation of the present disclosure. The control station 106 is provided solely for illustrative purposes, and is not to be regarded as a limitation of the present disclosure, unless noted otherwise herein. In embodiments, the nodes 102 may be an autonomous aircraft. In this regard, one or more functions of the control station 106 may be performed autonomously by the nodes 102.

The server 108 may include a processor and a memory. The server 108 may include a cloud-based architecture. For instance, it is contemplated herein that the server 108 may include a hosted server and/or cloud computing platform including, but not limited to, Amazon Web Services™ (e.g., Amazon™ EC2, and the like). In this regard, system 100 may include a software as a service (Saas) configuration, in which various functions or steps of the present disclosure are carried out by a remote server. The server 108 may be considered a global hosted cloud.

In embodiments, the nodes 102, the control station 106, and/or the server 108 may be communicatively coupled by the network 104 in any manner known in the art. For example, the nodes 102, the control station 106, and/or the server 108 may be directly coupled such that signals may be transmitted directly between the nodes 102, the control station 106, and/or the server 108. By way of another example, the nodes 102, the control station 106, and/or the server 108 may be communicatively coupled by an indirect coupling via the network 104. In embodiments, nodes 102, the control station 106, and/or the server 108 may each include network interface circuitry configured to interface with the network 104. The network interface circuitry may include any wireline or wireless network interface circuitry.

The network 104 may include any network known in the art. For example, the network 104 may include, but is not limited to, a network of terrestrial communication nodes (e.g., communication towers), a network of mobile communication nodes (e.g., mobile terrestrial communication nodes, mobile airborne communication nodes), and the like. It is further noted herein that the nodes 102, the control station 106, and/or the server 108 may be directly and/or indirectly (via network 104) communicatively coupled to one another via any communication protocols known in the art including, but not limited to, Link-16, Control and Non-Payload Communications (CNPC), GSM, GPRS, CDMA, EV-DO, EDGE, WIMAX, 3G, 4G, 4G LTE, 5G, WiFi protocols, radio frequency (RF), LoRa, and the like. For example, the nodes 102, the control station 106, and/or the server 108 may transmit data between each other, directly and/or via network 104, utilizing the L-band or C-band. By way of another example, the nodes 102, the control station 106, and/or the server 108 may utilize signals in the range of 450 MHZ-5 GHZ, or any frequency or range of frequencies known in the art. The network 104 may also include any wireline communication protocol (e.g., DSL-based interconnection, cable-based interconnection, and the like). Interactions between the nodes 102, control station 106, and/or the server 108 may be determined based on one or more characteristics including, but not limited to, IP addresses, MAC addresses, and the like.

In embodiments, the system 100 include a cloudlet 101. The cloudlet 101 may include the nodes 102. In embodiments, the cloudlet 101 may be formed dynamically. The cloudlet 101 may further be formed with any number of the nodes 102. The system 100 may also include multiple of the cloudlets 101. The nodes 102 in the cloudlet 101 perform operation under control from the control station 106. The control station 106 issues commands to control the cloudlet 101 over the network 104. For example, the cloudlet 101 may refer to a set of UAVs and the like. By way of another example, the cloudlet 101 may include various manned assets, such as, vehicles (manned vehicles and/or unmanned vehicles), such as, but not limited to, aircraft (e.g., manned aircraft and/or unmanned aerial systems (UAS)), spacecraft, ground vehicles, ships, soldiers, military installations, and the like. It is further contemplated that the cloudlet 101 may include various commercial drone delivery nodes and the like, and is not intended to be limited to military contexts.

The control station 106 may allocate specific tasks to each node 102 in the cloudlet 101. However, the number of tasks and nodes may be beyond the capability of human operators in the control station 106 to allocate specific task to each node 102 in the cloudlet 101. In embodiments, the control station 106 may issue a command with a high-level task. The high-level task may be within the capability of the human operator in the control station 106 to allocate to the cloudlet 101. The high-level task may also be referred to as a playbook command.

Referring now to FIG. 1B, the cloudlet 101 is described. In embodiments, the nodes 102 may include master nodes 102 and work nodes 102. The cloudlet 101 may include two types of computational units. The master nodes 102 include a master computation unit and the worker nodes 102 may include worker computational units. The master nodes 102 may receive a high-level task from the control station 106. The master node 102 and the worker nodes 102 may be unable to directly perform the high-level task. Instead, the master nodes 102 may divide the high-level task into multiple low-level tasks and delegate the low-level tasks to the worker nodes 102. In embodiments, the master node may execute a stack 300. The stack 300 may cause the master node to delegate low-level tasks to the worker nodes. The master nodes 102 and the worker nodes 102 may be any remote edge node that can compute and talk on the cloudlet 101.

In embodiments, the cloudlet 101 may generally include at least one of the master nodes 102. For example, the cloudlet may include one to M of the master nodes, where M is a positive integer. In this regard, recitations of the term a master node should be interpreted to refer to one or more of the master nodes or from one to M of the master nodes. In embodiments, the cloudlet 101 may include zero or more of the worker nodes 102. For example, the cloudlet 101 may include zero to N of the worker nodes 102, where N is a positive integer.

Although the cloudlet 101 is described as including the master node executing the stack 300, this is not intended as a limitation of the present disclosure. In embodiments, each of the nodes may be considered master nodes. For example, each of the nodes 102 in the cloudlet 101 may execute the tactical cloud software stack (TCSS). In this regard, any of the nodes 102 may receive the COMMAND and assign the tasks.

Figure 2:
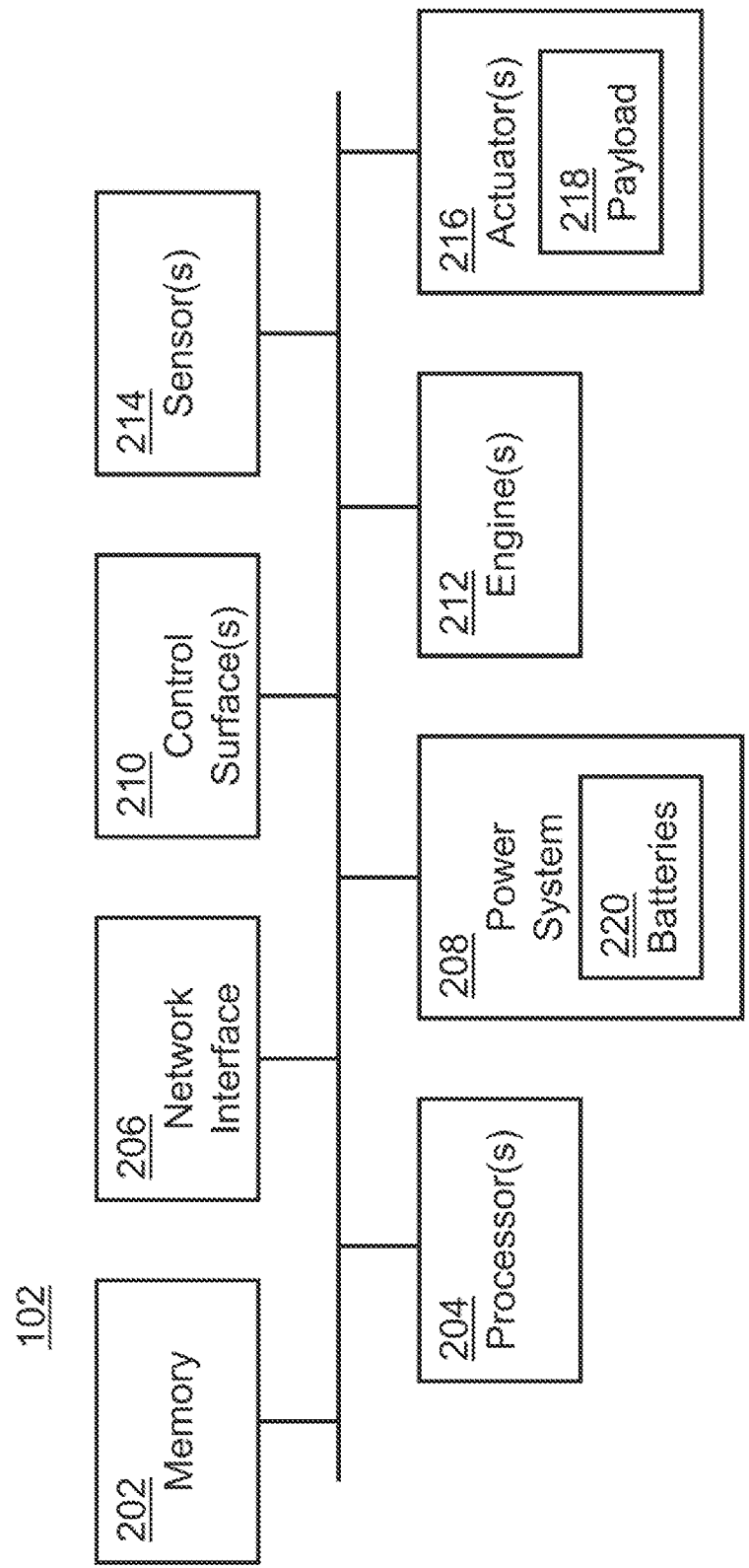
FIG. 2 depicts a node, in accordance with one or more embodiments of the present disclosure.

Referring now to FIG. 2, the nodes 102 are described, in accordance with one or more embodiments of the present disclosure. The nodes 102 may include one or more components, such as, but not limited to, a memory 202, one or more processors 204, a network interface 206, a power system 208, control surfaces 210, engines 212, sensors 214, actuators 216, and the like. One or more of components of the nodes 102 may be communicatively coupled by one or more control buses or the like.

The memory 202 may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, or the like. In an alternative embodiment, the memory may be located remotely with respect to the physical location of the processor. In another embodiment, the memory maintains program instructions for causing the processor(s) to carry out the various steps described through the present disclosure. The memory may include an operating system, program instructions, and the like, as will be described further herein. The program instructions may be executable by the processors 204, causing the processors 204 to execute a stack 300.

The one or more processors 204 may include any processing unit known in the art. For example, the processors may include a multi-core processor, a single-core processor, a reconfigurable logic device (e.g., FPGAs), a digital signal processor (DSP), a special purpose logic device (e.g., ASICs), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors. For example, the processors 204 may be configured to receive control commands from the ground station 106, and perform one or more tasks, functions, or flight maneuvers in response to the received control commands.

The network interface 206 may include any suitable network interface for interfacing with the network 104, such as, but not limited to, a wired or a wireless network interface. The network interface may include mechanical, electrical, or signaling circuitry for communicating data to and from the network and subsequently to various other nodes. The nodes 102 may be configured to receive various input signals and transmit various output signals from the network interface 206. The network interface 206 may couple the nodes 102 to the network 104. The network interface 206 may wirelessly communicate with the network 104 (e.g., via one or more radio signals).

The nodes 102 may include a power system 208. The power system 208 may provide power to any of the various components of the nodes 102. The power system 208 may include any system suitable for providing the power, such as, but not limited to, an electrical power system. In embodiments, the electrical power system includes one or more batteries 220. The electrical power system may monitor a state of charge of the batteries 220. The state of charge may also be referred to as a battery percentage. The power system 208 may also refer to a non-battery powered power system, such as a liquid fuel power system. The liquid fuel power system may include a fuel level.

In embodiments, the nodes 102 may include control surfaces 210 and/or engines 212. The control surfaces 210 and/or engines 212 may be adjusted to control the flight of the nodes 102 according to the control commands. The control surfaces 210 may include any control surface of a fixed-wing UAV. For example, control surfaces 210 may include, but are not limited to ailerons, elevators, rudders, spoilers, flaps, slats, air brakes, and the like. Although the nodes 102 are described in reference to the control surfaces 210 and/or engines 212 this is not intended to be limiting. However, the nodes 102 may generally include the surfaces 210 and/or engines 212 in the contexts where the nodes 102 are aerial vehicles.

In embodiments, the nodes 102 may include sensors 214. The sensors 214 may include any type of sensor, such as, but not limited to a GNSS sensor (e.g., GPS sensor), accelerometers, gyroscopes, magnetometers, barometers, inertial measurement units (IMUs), image sensors, RF sensors, radars, thermometers, acoustic sensors, and the like. For example, the image sensors may include but are not limited to, an electro-optic (EO) sensor, an infrared (IR) sensor, and the like. The processors 204 may receive sensor data from the sensors 214. The processors 204 may control the control surfaces 210 and/or engines 212 using one or more control loops based on the sensor data.

In embodiments, the nodes 102 may include actuators 216. The actuators 216 may control and/or deploy a payload 218 of the nodes 102. The payload 218 may include any payload suitable to be carried by UAVs, such as, but not limited to, boxed packages, ordinance payloads, and the like. The ordinance payloads may include a type, such as, but not limited to, bombs, missiles, rockets, and gun ammunition. The actuators 216 may also include any actuator allowing the nodes 102 to interact with the world. For example, the actuators 216 may include, but are not limited to, turning on lights, generating a jamming signal (e.g., GPS or RF jamming signal), deploying a water valve, playing a sound, dropping fire retardant, deploying a net or rope ladder, and the like.

Figure 3:
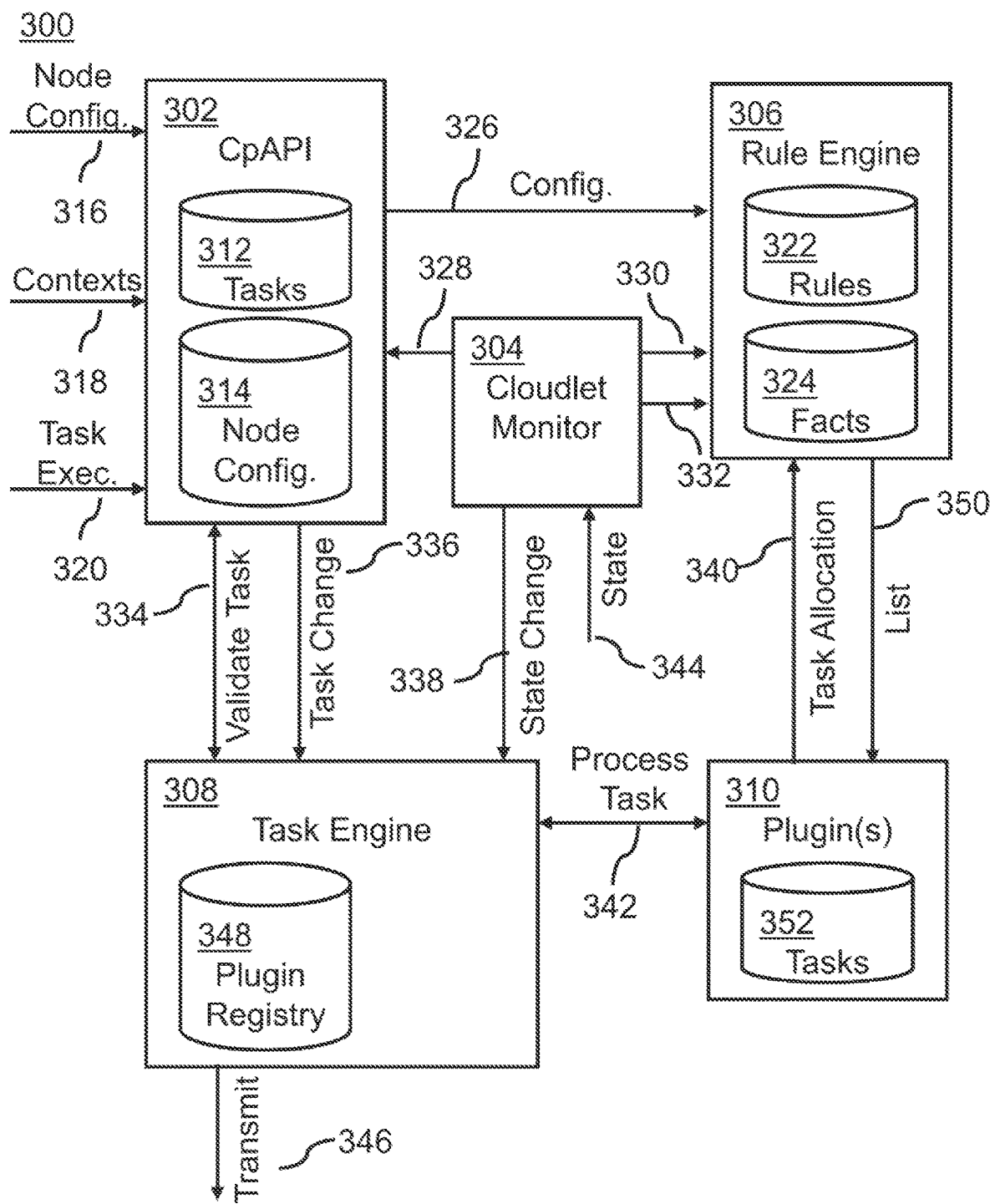
FIG. 3 depicts a stack, in accordance with one or more embodiments of the present disclosure.

Referring now to FIG. 3, a stack 300 is described, in accordance with one or more embodiments of the present disclosure. The stack 300 may also be referred to as a tactical cloud software stack (TCSS). The stack 300 may be maintained in the memory 202 and executable by the processors 204. The stack 300 is a set of services. Each service in the set of services performs a dedicated task. The set of services communicate with each other for sharing various data. The set of services includes a command processor (Cp) application programming interface (Api) (CpApi) 302, a cloudlet monitor 304, a rule engine 306, a task engine 308, and one or more plugins 310. The stack 300 may provide a management system for remote nodes, where a control (master) node delegates tasks to worker nodes, and those delegation rules are configurable at run-time.

In embodiments, the stack 300 is a microservices architecture. The microservice architecture may refer to splitting one or more services in the stack into independent services that are coupled together. Generally, the microservice architecture employs services that are independently employable. Many services within the microservice architecture are encapsulated within the stack. The independent services may include, but are not limited to, CpApi 302, cloudlet monitor 304, rule engine 306, task engine 308, and plugins 310. The services may be coupled by an application programming interface (API). For example, the services may be coupled by Crisp™ API or the like. The ability of the microservice architecture to parse an application into independent, loosely-coupled, individually deployable set of services allow for increased flexibility in application delivery, updating, and error correction. Although the stack 300 is described in the context of a microservices architecture, this is not intended to be limiting. Functions of the stack 300 may be implemented in a monolithic piece of software.

In embodiments, the stack 300 is an event-driven architecture. The event-driven architecture may include detecting an event. The event may include, but is not limited to, receiving various commands from the CpApi 302. The event-driven architecture may drive one or more responses in response to the command.

The CpApi 302 is now described. The CpApi 302 is a gateway or entry point into the stack 300. The CpApi 302 accepts one or more commands. For example, the control station 106 may send the commands. The CpApi 302 receives the commands. The commands received by the CpApi 302 may include, but are not limited to, node mission configurations 316, rule engine contexts 318, and task execution requests 320. The CpApi 302 may then analyze the commands and determine whether the commands are valid or not valid. The CpApi 302 determines whether the commands are valid or not valid based on the commands having required data. For example, the CpApi 302 may accept and validate the node mission configurations 316, rule engine contexts 318, and/or task execution requests 320.

The node mission configurations 316 are now described. The node mission configurations 316 may also be referred to as authenticated descriptors. The node mission configurations 316 define the capability of the nodes. The node mission configurations 316 may be shared on initiation of the nodes 102 to the network 104. The node mission configurations 316 may be a command to update configurations about the nodes 102 in the cloudlet 101. The node mission configurations 316 may include various information about the nodes 102, such as, but not limited to, a type of the nodes 102 (e.g., a type of the unmanned aerial vehicles of the nodes 102), a type of the sensors 214, a type of the actuators 216 (e.g., a type of a payload 218), a top speed, and the like.

The rule engine contexts 318 are now described. The rule engine contexts 318 may be a command to update the contexts of the rule engine 306. For example, the context of the rule engine may include, but is not limited to, "task allocation." The rule engine contexts 318 may also include the rules 322 of the rule engine 306. In this regard, the CpApi 302 may receive the command with the rule engine contexts 318. The CpApi may then provide the rule engine contexts 318 to the rule engine 306. The rule engine 306 may receive and maintain the rule engine contexts 318 as the rules 322.

The task execution requests 320 are now described. The task execution requests 320 may be a command to execute tasks 312. The tasks 312 may be high-level tasks 312 which are not individually executable by the nodes 102. The high-level tasks 312 may be broken into low-level tasks 352 which are individually executable by the nodes 102. The low-level tasks 352 may be referred to as subtasks of the high-level task 312. For example, the high-level task 352 may include surveil an area. The low-level tasks associated with the high-level task of surveilling the area may include assigning specific nodes with cameras and sensors to fly to and surveil the area using the cameras and sensors.

The CpApi 302 may maintain tasks 312 and/or node configurations 314. The tasks 312 and/or node configurations 314 may be maintained in memory 202.

The CpApi 302 may maintain the tasks 312 based on the task execution requests 320. The tasks 312 may include a status of the task and/or a state of the task. The CpApi 302 may detect a new high-level task 312 has been received in the task execution request 320 and send the task changed 336 to the task engine 308.

The CpApi 302 may maintain node configurations 314. The node configurations 314 may include the node mission configurations 316 received from the network 104. The CpApi 302 may detect a change in the node configurations 314 and send the configuration 326 to the rule engine 306.

In embodiments, the CpApi 302 may provide the configuration 326 to the rule engine 306. The configuration 326 may include the node configurations 314 of the nodes 102 in the cloudlet 101.

The cloudlet monitor 304 is now described. The cloudlet monitor 304 may be considered an edge telemetry layer to gather dynamic status information of the nodes 102. The cloudlet monitor 304 is software that monitors status information of the nodes 102 in the cloudlet 101. The cloudlet monitor may monitor various status information, such as, the number of nodes, status of nodes, CPU load, location, current tasks, and the like. The cloudlet monitor 304 may receive and monitor the state 344 of the cloudlet 101. The state 344 may include real-time data regarding the status of the cloudlet 101. The state 344 of the cloudlet 101 may refer to status information about the nodes 102 in the cloudlet 101. In this regard, the cloudlet monitor 304 may monitor information about the nodes 102. The information about the nodes 102 may include, but is not limited to, a network condition (e.g., communication status available, bandwidth, and the like), location of nodes, heading of nodes, loads (e.g., processor loads, memory loads, and the like), remaining payload, fuel remaining, state of charge of a battery, and the like. The state 344 may refer to a dynamic node status. The dynamic node status is determined by periodic node telemetry.

The cloudlet monitor 304 may receive the state 344 of the cloudlet 101 from the nodes 102 in the cloudlet 101. Individuals of the nodes 102 share the state 344 data to allow the stack 300 to make low-level task 352 allocation decisions. In embodiments, the nodes 102 may implement a gossip protocol to share the state 344 of the cloudlet 101 between the nodes 102 in the cloudlet 101. The gossip protocol may disseminate the state 344 between the nodes 102. The gossip protocol may indicate that the nodes do not directly request for data between the nodes 102. Instead, each of the nodes 102 generates the state 344 regarding the state 344 of itself and automatically sends the data to surrounding nodes 102. The surrounding nodes 102 receive the state 344 and relay the state 344 to other nodes in the cloudlet 101. The state 344 is then disseminated between and spread across the nodes 102.

In embodiments, the cloudlet monitor 304 may cause the nodes 102 to transmit and/or receive the state 344. The cloudlet monitor 304 may cause the nodes 102 to transmit and/or receive the state 344 via the network interface 206. For example, the cloudlet monitor 304 may cause the nodes 102 to transmit the state in response to generating the state 344 about itself and/or to relay the state 344 from another node. By way of another example, the cloudlet monitor 304 may cause the nodes 102 to receive the state from another of the nodes 102.

The cloudlet monitor 304 may provide status information 330 of the worker nodes 102b to the rule engine 306. The rule engine 306 may receive and maintain the status information 330 as facts 324. In embodiments, the cloudlet monitor 304 may monitor the cloudlet 101 for changes to the nodes 102. The cloudlet monitor 304 may detect changes in the cloudlet 101 and/or the nodes 102. The cloudlet monitor 304 may then provide updated statuses 332 to the rule engine 306. The rule engine 306 may receive and maintain the status information 330 as facts 324. The facts 324 may be considered real-time facts by being updated in response to receiving the updated statuses 332. The facts 324 may also be referred to as configured contexts.

In embodiments, the cloudlet monitor 304 may provide data 328 to the CpApi 302. The data 328 may include a data regarding the status of the cloudlet 101.

The rule engine 306 is now described. The rule engine 306 may decide what rules 322 should be applied in a situation. The rule engine 306 may receive and maintain rules 322 and facts 324. The rule engine 306 may apply the rules 322 to the facts 324 deterministically. The rule engine 306 may deterministically produce the allocation of nodes 102 to low-level tasks 352 based on the rules 322 and the facts 324. The rule engine 306 finds solutions to constraint networks based on formally expressed rules. The rule engine 306 is deterministic and executes discrete logic with complete precision. The rule engine 306 relies on knowledge expressed in the form of rules 322. The deterministic property is preferable for high-assurance, mission-critical command & control, certification, and the like. The rule engine 306 may support formal proofs of correct behavior. The rule engine 306 is generic to each of the plugins 310. Each of the plugins 310 reuse the rule engine 306.

The capability of the worker nodes 102b may be maintained as the facts 324. The capability may be based on the node configuration 316 and/or the state 344 of the nodes 102. The rule engine 306 may perform a binary determination or a scalar determination. For example, the binary determination may be based on a sensor type of the nodes 102. By way of another example, the scalar determination may be based on a distance from nodes 102 to a target. Various other binary and scalar determinations may also be performed.

The rule engine 306 may generate a list 350 of one or more worker nodes 102b for each of the low-level tasks 352. The rule engine 306 generates the lists 350 to match the requirements of the low-level tasks 352. The rule engine 306 may generate the list 350 based on the facts 324 and the rules 322. The list 350 may be ranked or prioritized. The ranking of the list 350 may recommend the best nodes based on the requirements. The plurality of low-level tasks 352 are individually executable by the worker nodes 102b in the list 350. The rule engine 306 may return the list 350 to the plugins 310.

The rule engine 306 allows programmatic allocation of low-level tasks 352 to the nodes 102. The programmatic allocation is matched to the capability of the platform of the nodes 102, such as aircraft type, sensor capabilities, munition type, top speed, turn rate, and the like. The programmatic allocation is also matched to the current status of the platform of the nodes 102, such as health, position, fuel remaining, computational load, network condition, presence of other nodes (e.g., hostile or enemy nodes), remaining munitions, and the like. In embodiments, the programmatic allocation is matched to both the static and dynamic properties of the nodes 102. The static properties of the nodes 102 may refer to the capability of the platform of the nodes 102, such as aircraft type, sensor capabilities, munition type, top speed, turn rate, and the like. The dynamic properties of the nodes 102 may refer to the current status of the platform of the nodes 102, such as health, position, fuel remaining, computational load, network condition, presence of other nodes (e.g., hostile or enemy nodes), remaining munitions, and the like.

In embodiments, the rule engine 306 may include an expert system. The expert system defines prerequisite logic for executing specific tasks. The expert language defines the rules 322 and the facts 324. The expert systems may be a computer algorithm which applies the rules 322 to the facts 324. The rule engine 306 matches requirements of the low-level tasks 352 to the worker nodes 102b using the expert system. The expert system may be deterministic. The deterministic property of the expert system indicates that the expert system will always produce the same output given the same initial input. The rule engine may be a passive service. The expert system may allow the stack 300 to automatically match low-level tasks 352 to the nodes 102 based on complex criteria.

The expert system may be implemented in one or more computer programming languages. For example, the expert system may be implemented in C Language Integrated Production System (CLIPS).

The rules 322 are logical statements or logical expressions. The rule engine may include rules 322. The rules 322 may be maintained in a human-readable format. For example, the rules 322 may be maintained in JavaScript™ Object Notation (JSON). The rules 322 may be updated at run-time. In embodiments, the rules for a given application can be customized, without modification to the rules engine software itself. For example, the rule engine 306 may receive the rule engine context 318 and maintain the rule engine context as the rules 322. Changing the rules 322 (e.g., via the rule engine contexts 318) may cause the cloudlet 101 and the nodes 102 to behave differently. The rules 322 are fully customizable for different missions. In embodiments, the rules 322 are defined dynamically. The rules 322 may be dynamically updated during a mission. The rules 322 may be changed by redeploying the stack 300 or the like.

The rules 322 may include if-then statements, decision tables, and the like. An example of the rules 322 are now provided. For example, the rules 322 may be defined based a proximity to an area. If the nodes 102 are within a range to the area, then the nodes 102 are eligible to be delegated the low-level tasks 352. By way of another example, the rules 322 may be defined based on the type of the sensors 214. If the nodes 102 include an image sensor, then the nodes 102 are eligible to be delegated low-level tasks 352 from a surveillance plugin. By way of another example, the rules 322 may be defined based on the network status. If the nodes 102 are available for communication, then the nodes 102 are eligible to be delegated the low-level tasks 352. For instance, the rules 322 may define a minimum network condition of the node 102 on the network 104. The rules dictate if the network condition of the node 102 degrades below the minimum network condition, the task is reallocated to another node.

The facts 324 may include static facts regarding the node mission configuration 316 of the nodes 102 in the cloudlet 101. The rule engine 306 is configured to receive and maintain the node mission configuration 316 as the facts 324. The node mission configuration 316 may include the static facts.

The facts 324 may include dynamic facts regarding the current state 344 of the nodes 102 in the cloudlet 101. The rule engine 306 is configured to receive and maintain the state 344 as the facts 324. In this regard, the rule engine 306 knows the position of the nodes 102, memory allocations, and the like of the nodes 102 in the cloudlet 101.

The task engine 308 is now described. The task engine 308 is a framework which allows the plugins 310 to be loaded. The task engine 308 receives the high-level task 312 from the CpApi 302. The task engine 308 receives the high-level task 312 from the CpApi 302 in a task changed 336 notification. The task engine 308 receives and processes the high-level task 312. The task engine 308 delegates the high-level task 312 to one plugin of the plugins 310. The task engine 308 includes a plugin registry 348 of each of the plugins 310. The task engine 308 may look up the plugins 310 in the plugin registry 348.

The task engine 308 may follow a behavior. The behavior of the task engine 308 is hard coded. The task engine 308 decides what to do with high-level task 312 given the behavior. For example, the task engine 308 may know the task received from the CpApi 302 in the task changed 336 notification is the high-level task 312. The behavior may also cause the task engine 308 to delegate the high-level task 312 to the one plugin. The task engine 308 may delegate the high-level task 312 to the plugin in a process task 342 request. The task engine 308 may also receive allocations of the low-level tasks 352 to allocated worker nodes of the worker nodes 102b from the plugins 310 in a process task 342 response. The task engine 308 may then transmit 346 the low-level tasks 352 to the allocated worker nodes.

The task engine 308 may also control and monitor the tasks (e.g., the high-level tasks 312 and/or the low-level tasks 352). For example, the task engine 308 may control and monitor the low-level tasks 352 which are performed or executed by the nodes 102 which are allocated the low-level tasks 352. The task engine 308 may detect the plugins 310 did not assign the low-level tasks 352, such that the high-level task 312 has failed. The task engine 308 may reload the plugins 308 in response to detecting the failure.

In embodiments, the task engine 308 receives a validate task request 334 from the CpApi 302. The task engine 308 validates the high-level tasks 312 by request.

In embodiments, the task engine 308 monitors the state of the cloudlet 101. For example, the task engine 308 may receive a state change 338 notification from the cloudlet monitor 304. The state change 338 notification may indicate the cloudlet 101 is online, offline, and the like. The state change 338 notification may also indicate the states of the nodes 102 in the cloudlet 101.

The plugins 310 are now described. The plugins 310 may also be referred to as task engine plugins. The plugins 310 are software components that add specific features to the task engine 308. The plugins 310 receives the high-level task 312. For example, the plugins 310 receives the high-level task 312 as a process task 342 link. The plugins 310 divide the high-level task 312 into low-level tasks 352. The plugins 310 may divide the high-level tasks 312 into the low-level tasks 352 by one or more rules maintained in the plugins 310. The task engine 308 does not perform individual tasks for the nodes 102, such as navigation, surveillance, DILR, and the like. Rather, the task engine 308 delegates the tasks to the plugins 310. The individual tasks for the nodes 102 are then performed by the plugins 310. The functionality of the plugins 310 may be modified without changing the task engine 308.

The plugins 310 execute operations as a set of low-level tasks 352 allocated to the worker nodes 102b. The plugins 310 may allocate the low-level tasks 352 to the worker nodes 102b based on the capability of the worker nodes 102b. The plugins 310 decides what to do by asking the rule engine 306. The plugins 310 may send a task allocation 340 request to the rule engine 306. The task allocation 340 request may include the requirements of the low-level tasks 352. For example, the plugins 310 may ask the rule engine if I have these facts, what is my instruction.

The plugins 310 may receive the list 350 from the rule engine 306. The plugins 310 may assign the low-level tasks 352 to allocated worker nodes in the list 350 of the one or more worker nodes for each of the low-level tasks 352. The plugins 310 relays the delegation to the task engine 308 in the process task 342. The task engine 308 then assigns the nodes to the low-level tasks 352 according to the delegation. In this regard, the stack 300 may assign the low-level tasks 352 to the nodes 102 automatically or without a human having to manually assign the low-level tasks to individual nodes.

In embodiments, the plugins 310 may process task redistribution requests. Task redistribution requests may refer to redistributed the allocation of the low-level tasks 352 to the nodes 102. The task redistribution requests may allow re-tasking for resiliency.

In embodiments, the plugins 310 may process task reinforcement requests.

The plugins 310 are mission-specific plug-ins. The plugins 310 are an implementation or execution in a specific task. The plugins 310 may implement different tasks. The plugins 310 may include plugins for different type of tasks and different operations of the nodes 102. For example, the plugins 310 may include a surveillance plugin, a Detect, Identify, Locate and Report (DILR) plugin, flight control plugins, payload plugins, and the like.

The plugins 310 may access one or more devices of the nodes 102, such as, but not limited to, cameras, flight systems, gyroscopes, actuators, sensors, lidar, RGB camera, heat-thermal camera, and the like. The flight plugins may control the control surfaces 210 and/or the engines 212 of the nodes 102. The flight plugins may actuate the control surfaces 210 and/or the engines 212 to control a flight of the nodes 102. The flight plugins may control the flight of the nodes 102 within one or more operational parameters. For example, the operational parameters may include altitudes (e.g., maximum altitude, minimum altitude), position (e.g., latitude coordinates and longitude coordinates), speed (e.g., minimum speed, maximum speed), G-forces (e.g., maximum G-force), maneuvers, and the like. The surveillance plugins and/or the DILR plugins may control one or more of the sensors 214 of the nodes 102. For example, the surveillance plugins and/or the DILR plugins may control image sensors of the nodes 102. The payload plugins may control one or more of the actuators 216 of the nodes 102. The payload applications 316 may actuate the actuators 216 to deploy the payloads 218 of the nodes 102. Although the plugins 310 are described in the context of an node which is an aerial vehicle, this is not intended as a limitation of the present disclosure. It is further contemplated that the plugins 310 may be applied across a variety of types of nodes. The plugins 310 may be any edge processing function that can be programmatically delegated to a selection of edge worker nodes.

In embodiments, the stack 300 is extensible. The stack 300 may be extensible allowing introducing new types of tasks. The new types of tasks may use new or updated copies of the plugins 310. In embodiments, the task engine 308 may register the new or updated copies of the plugins 310 in the plugin registry 348. In this regard, the plugins 310 may be updated or changed by registering the plugin registry 348.

Figure 4:
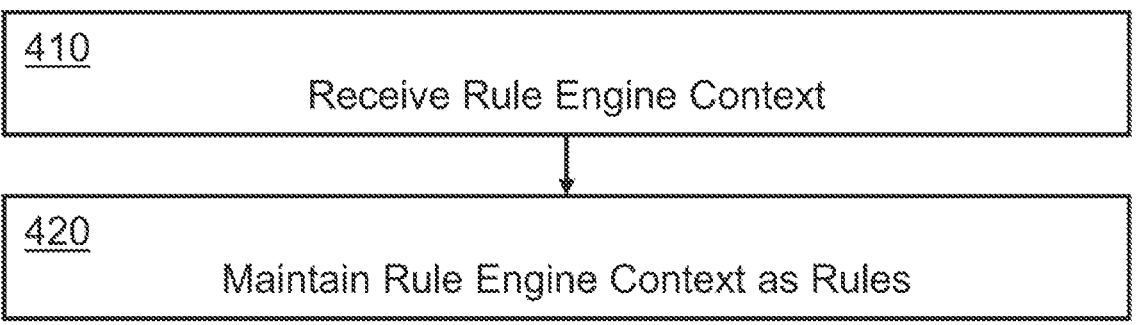

Referring now to FIG. 4, a flow diagram of a method 400 is described, in accordance with one or more embodiments of the present disclosure. The method 400 may describe maintaining the rules 322 in the rule engine 306. The method 400 may be further understood with reference to the stack 300. For example, the method 400 may be one workflow in the stack 300.

In a step 410, the rule engine context 318 is received. The CpApi 302 may receive the rule engine context 318. The CpApi 302 may receive the rule engine context 318 by the network interface 206 from the control station 106 via the network 104.

In a step 420, the rule engine 306 is configured to receive the rule engine context 318 and maintain the rule engine context 318 as rules 322. The rule engine 306 may receive the rule engine context 318 via the configuration 326 from the CpAPi 302 to the rule engine 306.

The steps 410 and 420 may be performed during initialization of the rule engine 306. The steps 410 and 420 may then be iteratively repeated to update the rules 322. Additional rule engine context 318 may be received by the CpApi 302. The CpApi 302 may validate the additional rule engine context 318 and send additional configuration 326 to the rule engine 306. The rule engine 306 receives the additional rule engine context 318 and maintains the additional rule engine contexts 318 as additional rules 322.

Referring now to FIG. 5, a flow diagram of a method 500 is described, in accordance with one or more embodiments of the present disclosure. The method 500 may describe maintaining the facts 324 in the rule engine 306. The method 500 may be further understood with reference to the stack 300. For example, the method 500 may be a second workflow in the stack 300.

In a step 510, status information of the worker nodes 102b is monitored. The cloudlet monitor 304 receives the state 344 from the worker nodes 102b. Each node 102 inside the cloudlet 101 gets the states 344 from other nodes in the cloudlet 101. The cloudlet monitor 304 receives the state 344 from the worker nodes 102b via the network interface 206. The cloudlet monitor 304 then monitors the status information of the worker nodes 102b based on the state 344.

In a step 520, the rule engine 306 is configured to receive and maintain the status information as facts 324. The rule engine 306 may receive the status information status information 330 of the worker nodes 102b to the rule engine 306. The cloudlet monitor 304 may also detect changes in the cloudlet 101 and/or the nodes 102. The cloudlet monitor 304 may then provide updated statuses 332 to the rule engine 306. The rule engine 306 then maintains a real-time list of the facts 324 regarding the nodes 102.

Figure 6:
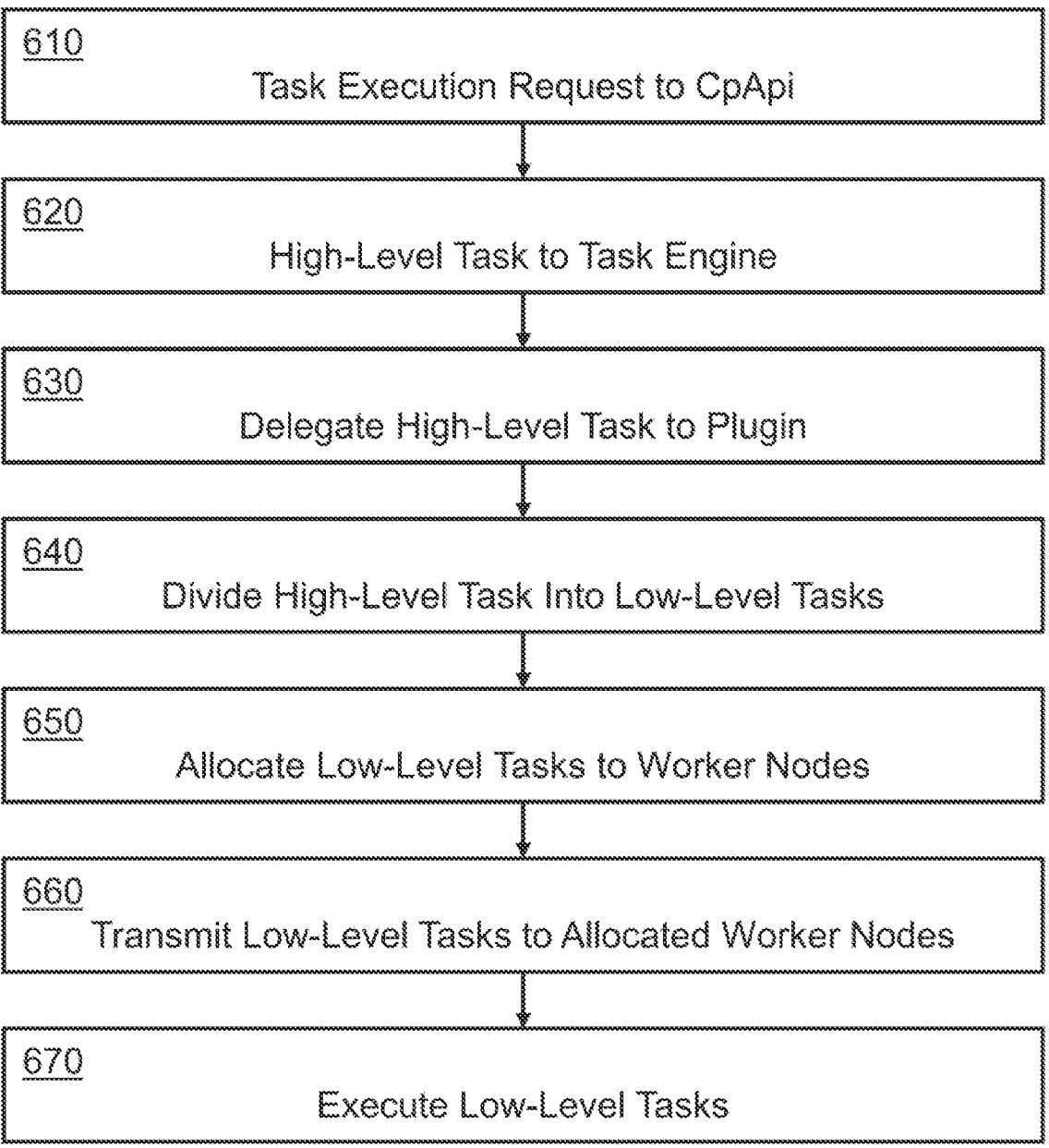

Referring now to FIG. 6, a flow diagram of a method 600 is described, in accordance with one or more embodiments of the present disclosure. The method 600 may describe assigning or allocating low-level tasks 352 in response to receiving high-level tasks 312. The method 600 may be further understood with reference to the stack 300. For example, the method 600 may be a third workflow in the stack 300.

In a step 610, the task execution request 320 is sent to the CpApi 302. The task execution request 320 is sent to the CpApi 302 from the control station 106 over the network 104. The task execution request 320 is sent to the CpApi 302 of the node 102 (e.g., the master node 102a). The CpApi 302 receives the task execution request 320. The CpApi 302 receives the task execution request 320 from the network 104 by the network interface 206. The CpApi 302 validates the task execution request 320. The task execution request 320 includes the high-level task 312 which is not individually executable by the node 102 (e.g., by the master node 102a and/or by the worker nodes 102b).

In a step 620, the high-level task 312 is sent to the task engine 308. The high-level task 312 is sent to the task engine 308 from the CpApi 302. The task engine 308 receives the high-level task 312 from the CpApi 302.

In a step 630, the high-level task 312 is delegated to one plugin of the plugins 310. The task engine 308 delegates the high-level task 312 to the one plugin. The task engine 308 delegates the high-level task 312 to the one plugin based on a type of the high-level task. The task engine 308 delegates the high-level task 312 to the plugin in the process task 342.

In a step 640, the plugin divides the high-level tasks 312 into the low-level tasks 352. The plugin divides the high-level tasks 312 into the low-level tasks 352 based on rules maintained in the plugins 310. For example, the plugin may include surveillance rules for dividing a high-level surveillance task into low-level surveillance tasks. By way of another example, the plugin may include DILR rules for dividing a high-level DILR task into low-level DILR tasks. The low-level tasks 352 are subtasks of the high-level tasks 312.

In a step 650, the plugin assigns the low-level tasks 352 to the worker nodes 102b based on the facts 324 and rules 322 in the rule engine 306. The plugin asks the rule engine 306 to return a set of the work nodes 102b that are available to execute each of the low-level tasks 352. The plugin asks the rule engine 306 in the task allocation request 340. The rule engine evaluates the requirements in the task allocation request 340. For example, the rule engine 306 may consider the availability of the nodes, the load of the nodes, and the like. The rule engine 306 then returns the set of the work nodes 102b that are available to execute each of the low-level tasks 352 to the plugin. The plugin 310 receives the list 350 of nodes that meet the requirements and assigns the low-levels tasks to allocated nodes within the list 350 of nodes. The low-level tasks 352 are then individually executable by the worker nodes 102b (e.g., by the allocated nodes). The plugin 310 may then relay the allocation of the low-levels tasks with the allocated nodes to the task engine 308. For example, the plugin 310 may then relay the allocation of the low-levels tasks to the allocated nodes to the task engine 308 in the process task 342.

In a step 660, the task engine 308 transmits 346 the low-level tasks to the worker nodes 102b. The task engine 308 may cause the network interface 206 to transmit 346 the low-level tasks to the worker nodes 102b over the network 104. The task engine 308 is configured to transmit 346 the low-level tasks 352 to the worker nodes 102b over the network 104 by the network interface 206. For example, the task engine 308 may transmit 346 the low-level tasks 352 to the worker nodes 102b over the network 104 by the network interface 206 directly, via the gossip protocol, or via another protocol.

In a step 670, the allocated nodes receive the low-level tasks and executes the low-level tasks. The allocated nodes may receive the low-level tasks directly from the master node 102a and/or indirectly (e.g., by a gossip protocol, or the like). The allocated nodes may include the plugins 310 for executing the low-level tasks. For example, the plugins 310 may cause the allocated nodes to fly to a location using the control surfaces 210 and engines 212. By way of another example, the plugins 310 may cause the allocated nodes to perform surveillance at the location using sensors 214. By way of another example, the plugins 310 may cause the allocated nodes to engage the actuators 216 to deploy the payloads 218 at the location using sensors 214.

Figure 7:
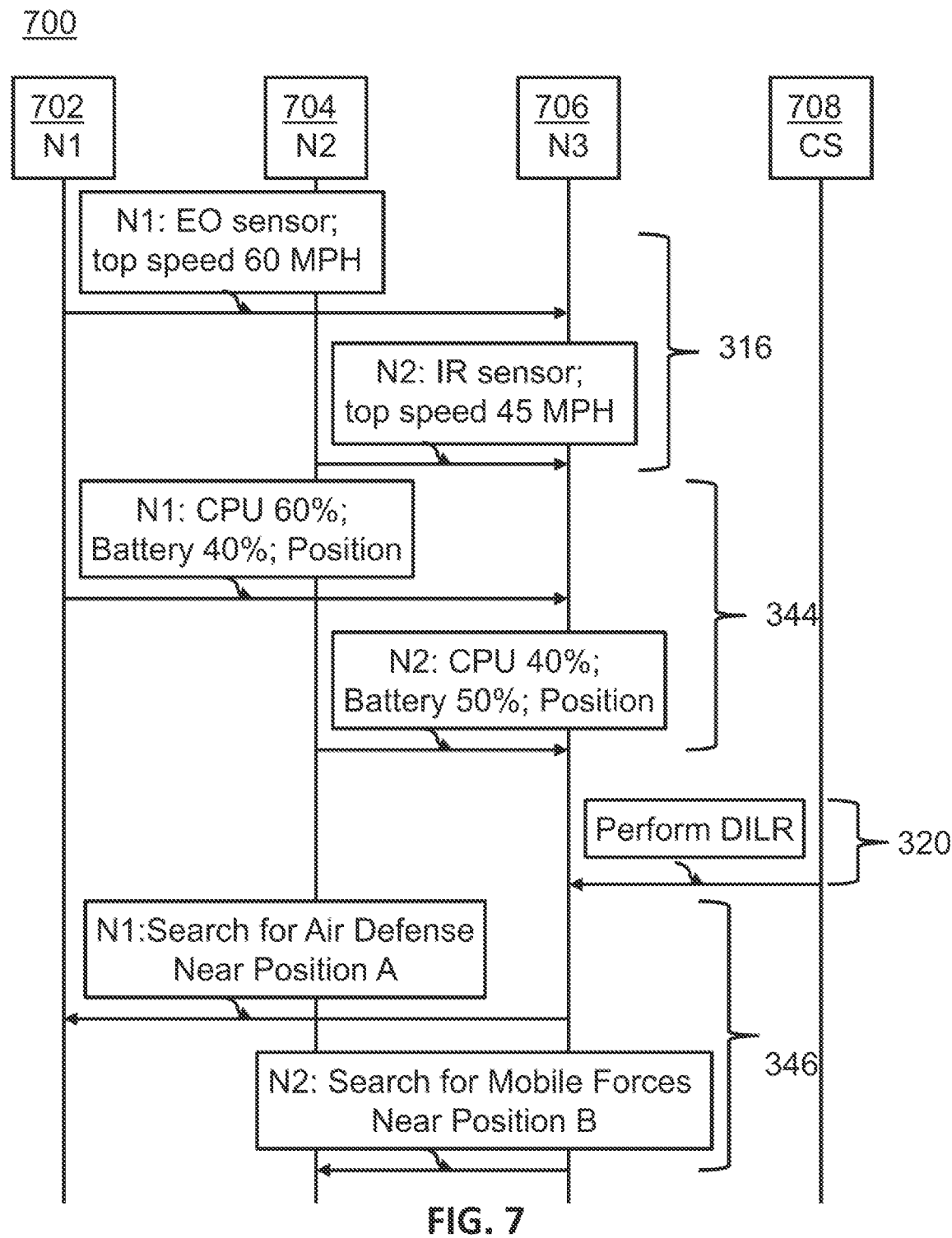
FIG. 7 depicts an exemplary timing diagram, in accordance with one or more embodiments of the present disclosure.

Referring now to FIG. 7, a timing diagram 700 is described, in accordance with one or more embodiments of the present disclosure. The timing diagram 700 may describe an example utilization of the system 100. The timing diagram 700 includes a node1 702 (N1), a node2 704 (N2), a node3 706 (N3), and a control station 708 (CS). The node1 702, node2 704, node3 706 may be examples of the nodes 102. For example, the node1 702 and node2 704 may be considered worker nodes 102b. By way of another example, the node3 706 may be considered master node 102a. The control station 708 may be an example of control station 106.

The node1 702, node2 704 are UAV assets. The node1 702, node2 704 may be one of many UAV assets in an edge network. Not all of the UAVs in the edge network are depicted. Additionally, not all of the UAVs in the edge network may include a capability to meet subtask requirements. The node3 706 is a manned aircraft. Consider UAV assets that get paired with a manned aircraft to perform a Detect-Identify-Locate-Report (DILR) mission. Although the nodes are described in the context of UAV assets, this is not intended as a limitation of the present disclosure. It is further contemplated that the nodes may be applied across a variety of types of nodes.

The UAVs (i.e., node1 702, node2 704) send the node configuration 316 to the manned platform (i.e., the node3 706). The node1 702, node2 704 may send the node configuration 316 on joining the cloudlet 101. As depicted, the node configuration 316 of node1 is that node1 includes an electro-optic (EO) sensor and has a top speed of 60 miles per hour. As depicted, the node configuration 316 of node2 is that node2 includes an infrared (IR) sensor and a top speed of 45 miles per hour.

The UAVs (i.e., node1 702, node2 704) send the states 344 to the manned platform. The node1 702, node2 704 may send the states 344 to the node3 706 at a regular interval. As depicted, one of the states 344 is sent, although this is not intended to be limiting.

The control station 708 directs the node3 706 to perform DILR in the task execution request 320. The perform DILR is communicated as a high-level "playbook" command. The control station 708 sends the node3 706 the task execution request 320 with a high-level task 312 to perform DILR in a region. Perform DILR in the region is not a task which is individually executable by any of the node1, node2, node3, or other UAVs in the cloudlet 101. Instead, the perform DILR in the region task must be divided into sub-tasks which are executable by the node1 702, node2 704, or other UAVs in the cloudlet.

The node3 706 includes the stack 300 with a DILR plugin. The task engine 308 receives the perform DILR task and identifies the DILR plugin as the suitable plugin for executing the perform DILR task. The task engine 308 delegates the DILR plugin to execute the perform DILR task. The DILR plugin divides the perform DILR task into low-level or subtasks, such as, but not limited to, search for air defense near a first position (A) and search for mobile forces near a second position (B). Each of the subtasks has specific operational requirements. The DILR plugin then sends the task allocation request 340 to the rule engine 306 for both the search for air defense near the first position (A) and search for mobile forces near the second position (B) subtasks. The rule engine 306 matches subtask requirements to available nodes (based on static (capability) and dynamic criteria), and generates a list with the best match. The rule engine 306 responds with the lists 350 of nodes for both the search for air defense near the first position (A) and search for mobile forces near the second position (B) subtasks. In this example, the node1 is in the list of nodes for the search for air defense near the first position (A) subtask and the node2 is in the list of nodes that can search for mobile forces near the second position (B) subtask. The DILR plugin then assigns the node1 to the search for air defense near the first position (A) subtask and assigns the node2 to the search for mobile forces near the second position (B) subtask. In this regard, the node1 is the allocated worker node from the list of worker nodes for the low-level task of search for air defense near the first position (A). Furthermore, the node2 is the allocated worker node from the list of worker nodes for the low-level task of search for mobile forces near the second position (B).

The task engine 308 receives the allocation from the DILR plugin and transmits 346 the allocation to the node1 702 and the node2 704. Node1 702 may then execute the subtask of searching for air defense near the first position (A). For example, the node1 702 may include a DILR plugin which includes causes the node1 to fly to the first position (A) and search for air defense using one or more sensors of the node1. Node2 704 may then execute the subtask of searching for mobile forces near the second position (B). For example, the node2 704 may include a DILR plugin which causes the node2 704 to fly to the second position (B) and search for air defense using one or more sensors of the node2.

Referring generally again to FIGS. 1A-7.

The embodiments and the enabling technology described previously herein in the context of the system 100, the node 102, and the stack 300 should be interpreted to extend to the methods 400, 500, 600. For example, the methods may be implemented by the system 100, the node 102, and the stack 300.

Although the payload 218 is described as including munitions, this is not intended as a limitation of the present disclosure. It is contemplated the system 100 may include several uses, such as, but not limited to, the orchestration of commercial UAV fleets, factory automation, and the like.

The methods, operations, and/or functionality disclosed may be implemented as sets of instructions or software readable by a device. The steps may include computations which may be performed simultaneously, in parallel, or sequentially. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure.

From the above description, the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A master node comprising:
   a memory maintaining program instructions; and
   one or more processors configured to execute the program instructions causing the one or more processors to execute a stack comprising a command processor application programming interface (CpApi), a cloudlet monitor, a rule engine, a task engine, and a plurality of plugins;
   wherein the CpApi is configured to receive a node mission configuration of a plurality of worker nodes, a rule engine context, and a task execution request; wherein the task execution request comprises a high level task which is not individually executable by the master node;
   wherein the cloudlet monitor is configured to monitor status information of the plurality of worker nodes;
   wherein the rule engine is configured to receive and maintain the node mission configuration and the status information as a plurality of facts; wherein the rule engine is configured to receive the rule engine context and maintain the rule engine context as a plurality of rules;
   wherein the task engine receives the task from the CpApi and delegates the task to one plugin of the plurality of plugins;
   wherein the one plugin divides the task into a plurality of subtasks;
   wherein the rule engine generates a list of one or more of the plurality of worker nodes for each of the plurality of subtasks based on the plurality of facts and the plurality of rules; wherein the plurality of subtasks are individually executable by the one or more of the plurality of worker nodes;
   wherein the one plugin assigns the plurality of subtasks to allocated worker nodes in the list of the one or more of the plurality of worker nodes for each of the plurality of subtasks;
   wherein the cloudlet monitor is configured to detect a change in the status information; wherein the cloudlet monitor is configured to cause the rule engine to update the plurality of facts with the change in the status information;
   wherein the plurality of worker nodes comprises processors; the status information comprising processor loads of the processors of the plurality of worker nodes.

2. The master node of claim 1, wherein the rule engine is an expert system comprising the plurality of rules and the plurality of facts; wherein the expert system is deterministic.

3. The master node of claim 1, wherein the plurality of worker nodes comprise unmanned aerial vehicles; wherein the node mission configuration comprises a type of the unmanned aerial vehicles.

4. The master node of claim 3, wherein the plurality of task plugins comprise at least one of a surveillance plugin or a detect, identify, locate, report (DILR) plugin; wherein the plurality of worker nodes comprise sensors; wherein the node mission configuration comprises a type of the sensors.

5. The master node of claim 1, wherein the plurality of worker nodes comprise unmanned aerial vehicles; the status information comprising a position and a heading of the plurality of worker nodes.

6. The master node of claim 1, the plurality of worker nodes comprising batteries; the status information comprising a state of charge of the batteries.

7. The master node of claim 1, wherein the master node comprises a network interface; wherein the CpApi is configured to receive the node mission configuration, the rule engine context, and the task execution request from a network by the network interface.

8. The master node of claim 7, the status information comprising a network condition of the plurality of worker nodes over the network.

9. The master node of claim 1, wherein the master node is an unmanned aerial vehicle.

10. The master node of claim 1, wherein the task engine validates the task in response to receiving the task from the CpApi.

11. The master node of claim 1, wherein the stack is a microservices architecture.

12. The master node of claim 1, wherein the master node comprises a network interface; wherein the task engine is configured to transmit the plurality of subtasks to the plurality of worker nodes over a network by the network interface.

13. A cloudlet comprising:
a plurality of worker nodes; and
a master node comprising:
  a memory maintaining program instructions; and
  one or more processors configured to execute the program instructions causing the one or more processors to execute a stack comprising a command processor application programming interface (CpApi), a cloudlet monitor, a rule engine, a task engine, and a plurality of plugins;
    wherein the CpApi is configured to receive a node mission configuration of the plurality of worker nodes, a rule engine context, and a task execution request; wherein the task execution request comprises a task which is not individually executable by the master node;
    wherein the cloudlet monitor is configured to monitor status information of the plurality of worker nodes;
    wherein the rule engine is configured to receive and maintain the node mission configuration and the status information as a plurality of facts; wherein the rule engine is configured to receive the rule engine context and maintain the rule engine context as a plurality of rules;
    wherein the task engine receives the task from the CpApi and delegates the task to one plugin of the plurality of plugins;
    wherein the one plugin divides the task into a plurality of subtasks;
    wherein the rule engine generates a list of one or more of the plurality of worker nodes for each of the plurality of subtasks based on the plurality of facts and the plurality of rules; wherein the plurality of subtasks are individually executable by the one or more of the plurality of worker nodes;
    wherein the one plugin assigns the plurality of subtasks to allocated worker nodes in the list of the one or more of the plurality of worker nodes for each of the plurality of subtasks;
    wherein the cloudlet monitor is configured to detect a change in the status information; wherein the cloudlet monitor is configured to cause the rule engine to update the plurality of facts with the change in the status information;
    wherein the plurality of worker nodes comprises processors; the status information comprising processor loads of the processors of the plurality of worker nodes.

14. The cloudlet of claim 13, wherein the task engine monitors a state of the cloudlet.

15. The cloudlet of claim 13, wherein the plurality of worker nodes implement a gossip protocol to share the node mission configuration of the plurality of worker nodes with the CpApi.

16. A system comprising:
a control station; and
a cloudlet communicatively coupled to the control station by a network, the cloudlet comprising:
  a plurality of worker nodes; and
  a master node comprising:
    a memory maintaining program instructions; and
    one or more processors configured to execute the program instructions causing the one or more processors to execute a stack comprising a command processor application programming interface (CpApi), a cloudlet monitor, a rule engine, a task engine, and a plurality of plugins;
      wherein the CpApi is configured to receive a node mission configuration of the plurality of worker nodes, a rule engine context, and a task execution request; wherein the task execution request comprises a task which is not individually executable by the master node;
      wherein the cloudlet monitor is configured to monitor status information of the plurality of worker nodes;
      wherein the rule engine is configured to receive and maintain the node mission configuration and the status information as a plurality of facts; wherein the rule engine is configured to receive the rule engine context and maintain the rule engine context as a plurality of rules;
      wherein the task engine receives the task from the CpApi and delegates the task to one plugin of the plurality of plugins;
      wherein the one plugin divides the task into a plurality of subtasks;
      wherein the rule engine generates a list of one or more of the plurality of worker nodes for each of the plurality of subtasks based on the plurality of facts and the plurality of rules; wherein the plurality of subtasks are individually executable by the one or more of the plurality of worker nodes;
      wherein the one plugin assigns the plurality of subtasks to allocated worker nodes in the list of the one or more of the plurality of worker nodes for each of the plurality of subtasks;
      wherein the cloudlet monitor is configured to detect a change in the status information; wherein the cloudlet monitor is configured to cause the rule engine to update the plurality of facts with the change in the status information;
      wherein the plurality of worker nodes comprises processors; the status information comprising processor loads of the processors of the plurality of worker nodes.

* * * * *